(12) United States Patent
Solomon

(10) Patent No.: US 10,205,696 B2
(45) Date of Patent: Feb. 12, 2019

(54) SYSTEMS METHODS CIRCUITS AND ASSOCIATED COMPUTER EXECUTABLE CODE FOR FACILITATING SELECTIVE MESSAGING AND MULTICASTING

(71) Applicant: Avi Solomon, Tel Aviv (IL)

(72) Inventor: Avi Solomon, Tel Aviv (IL)

(73) Assignee: Avi Solomon, Tel Aviv (IL)

( * ) Notice: Subject to any disclaimer, the term of this patent is extended or adjusted under 35 U.S.C. 154(b) by 130 days.

(21) Appl. No.: 14/736,366

(22) Filed: Jun. 11, 2015

(65) Prior Publication Data

US 2016/0366086 A1    Dec. 15, 2016

(51) Int. Cl.
*G06F 15/16*   (2006.01)
*H04L 12/58*   (2006.01)
*H04W 4/12*    (2009.01)
*H04W 4/04*    (2009.01)

(52) U.S. Cl.
CPC .............. *H04L 51/28* (2013.01); *H04L 51/14* (2013.01); *H04W 4/04* (2013.01); *H04W 4/12* (2013.01)

(58) Field of Classification Search
CPC ........ H04L 51/12; H04L 12/585; H04L 51/26
See application file for complete search history.

(56) References Cited

U.S. PATENT DOCUMENTS

| | | | | |
|---|---|---|---|---|
| 2001/0049745 A1* | 12/2001 | Schoeffler | ............... | H04L 51/14 709/238 |
| 2002/0193109 A1* | 12/2002 | Kobayashi | ............ | H04L 12/189 455/430 |
| 2008/0279356 A1* | 11/2008 | Zazza | ............... | H04M 3/42008 379/142.02 |
| 2011/0055335 A1* | 3/2011 | Reilly | .................. | G06Q 10/107 709/206 |
| 2011/0177829 A1* | 7/2011 | Platt | ..................... | G06Q 10/107 455/456.2 |
| 2011/0206200 A1* | 8/2011 | Sovio | .................... | H04L 9/3073 380/30 |
| 2012/0046068 A1* | 2/2012 | Katpelly | ............... | H04W 4/029 455/550.1 |
| 2013/0185371 A1* | 7/2013 | Ko | ........................ | H04W 4/021 709/206 |
| 2014/0370879 A1* | 12/2014 | Redding | ............... | H04W 4/001 455/419 |
| 2015/0017955 A1* | 1/2015 | Canto Fuertes | ......... | H04Q 3/72 455/414.1 |
| 2016/0094994 A1* | 3/2016 | Kirkby | ............... | G06K 9/00711 380/270 |
| 2016/0125364 A1* | 5/2016 | Field | .................. | G06Q 10/1097 705/7.21 |
| 2016/0203143 A1* | 7/2016 | Kritt | ................. | G06F 17/30696 707/722 |

* cited by examiner

*Primary Examiner* — Hieu T Hoang
(74) *Attorney, Agent, or Firm* — Vladimir Sherman; Professional Patent Solutions Ltd.

(57) ABSTRACT

Disclosed are systems methods circuits and associated computer executable code for facilitating selective messaging and multicasting, wherein system users are associated with one or more identifiers. And, wherein user messages or multicasts are relayed along with one or more identifiers or filtering conditions to a system server, and the system server relays the messages to users associated with the system server received identifiers or to users satisfying the system server received filtering conditions.

9 Claims, 7 Drawing Sheets

SYSTEMS METHODS CIRCUITS AND ASSOCIATED COMPUTER EXECUTABLE CODE FOR FACILITATING SELECTIVE MESSAGING AND MULTICASTING

FIELD OF THE INVENTION

The present invention generally relates to the field of instant messaging and multicasting. More specifically, some embodiments relate to systems methods circuits and associated computer executable code for facilitating selective messaging and multicasting.

BACKGROUND

Instant messaging is a set of communication technologies used for text-based communication between two or more participants over the Internet or other types of networks. IM—chat happens in real-time. Of importance is that online chat and instant messaging differ from other technologies such as email due to the perceived quasi-synchrony of the communications by the users. Some systems permit messages to be sent to users not then 'logged on' (offline messages), thus removing some differences between IM and email (often done by sending the message to the associated email account).

IM allows effective and efficient communication, allowing immediate receipt of acknowledgment or reply. However IM is basically not necessarily supported by transaction control. In many cases, instant messaging includes added features which can make it even more popular. For example, users may see each other via webcams, or talk directly for free over the Internet using a microphone and headphones or loudspeakers. Many applications allow file transfers, although they are usually limited in the permissible file-size.

It is usually possible to save a text conversation for later reference. Instant messages are often logged in a local message history, making it similar to the persistent nature of emails.

Still, there remains a need, in the fields of instant messaging and multicasting, for technologies that may facilitate instant messaging and/or multicasting communication with previously unknown individuals/users based on one or more identifiers associated with them/their-usernames.

SUMMARY OF THE INVENTION

The present invention is a system method circuit and computer executable code for facilitating selective messaging and multicasting. A first user may utilize an identifier to contact one or more second users associated with the identifier. System users may associate themselves, and/or be associated by the system, with one or more identifiers, wherein each of the associated identifier(s) pertains to a set of one or more associating/associated user(s). The system may register for each of the users, along with the identifiers associated with her/him, a Member-ID. Upon receipt of an identifier and a message from a first user, the system may search for other user(s) associated with the identifier. Member-ID(s) of users found to be associated with the received identifier may be retrieved and utilized for saving the message, and/or a pointer/link thereto, to respective Member-ID(s) corresponding mailboxes. A push notification may be sent to each of the users having Member-ID(s) found to be associated with the received identifier, informing them of the received message and/or offering/allowing its retrieval.

According to some embodiments of the present invention, a system for facilitating selective messaging and multicasting may comprise: (1) two or more Computerized Client Devices, running an application, for inputting from each of their respective users, and relaying to a System Server: (i) a user Member-ID (e.g. username, login name, device token, GUID/combination-thereof), and (ii) one or more Identifiers to be associated with the user Member-ID of the relaying client device; and (2) the System Server for receiving and storing the Member-ID(s) and their associated Identifier(s) to (3) an Identifiers Database.

According to some embodiments of the present invention, upon receipt of a first user request including a Message and at least one user associated Identifier—the System Server may: (i) search the Identifiers Database and retrieve the Member-ID(s) of one or more second user(s) associated with the Identifier(s) included in the first user request, (ii) store the received message to (4) a Messages Database under specific Member-ID(s) corresponding locations (e.g. files, mailboxes, inboxes, folders or the like), of some or all of the Member-ID(s) associated with the Identifier(s) included in the first user request, and/or (iii) Notify Computerized Client Devices users having a Member-ID(s) associated with 'first user request Identifier(s)' (i.e. Member-ID(s) of the Message's intended recipient(s)/destination(s)) of the new Message stored to their Member-ID corresponding location.

According to some embodiments, notifying Computerized Client Device users of the new Message stored to their Member-ID corresponding location, may include: (i) the System Server forwarding the retrieved Member-ID(s) of the one or more second user(s) associated with the Identifier(s) included in the first user request, to an integral, a networked, and/or an elsewise functionally associated (5) Push Notification Server; (ii) the Push Notification Server for pushing 'new message' notifications to each of the Computerized Client Devices corresponding to the retrieved Member-ID(s); and/or (iii) each of the Computerized Client Devices that received a 'new message' notification, for accessing their respective Member-ID(s) corresponding location/inbox on the Messages Database and retrieving and presenting, or rendering an image of, the Message on each of the accessing Computerized Client Devices.

Accordingly, users may receive push notifications to their Computerized Client Devices, informing them that the Message has been stored to their Member-ID associated location, and then retrieve/view it using their Client Device Application. Alternatively, the Client Device Application may intermittently access the Messages Database (e.g. through the System Server), check its Member-ID associated location/inbox for new messages, and retrieve and/or present new messages if such have been received.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
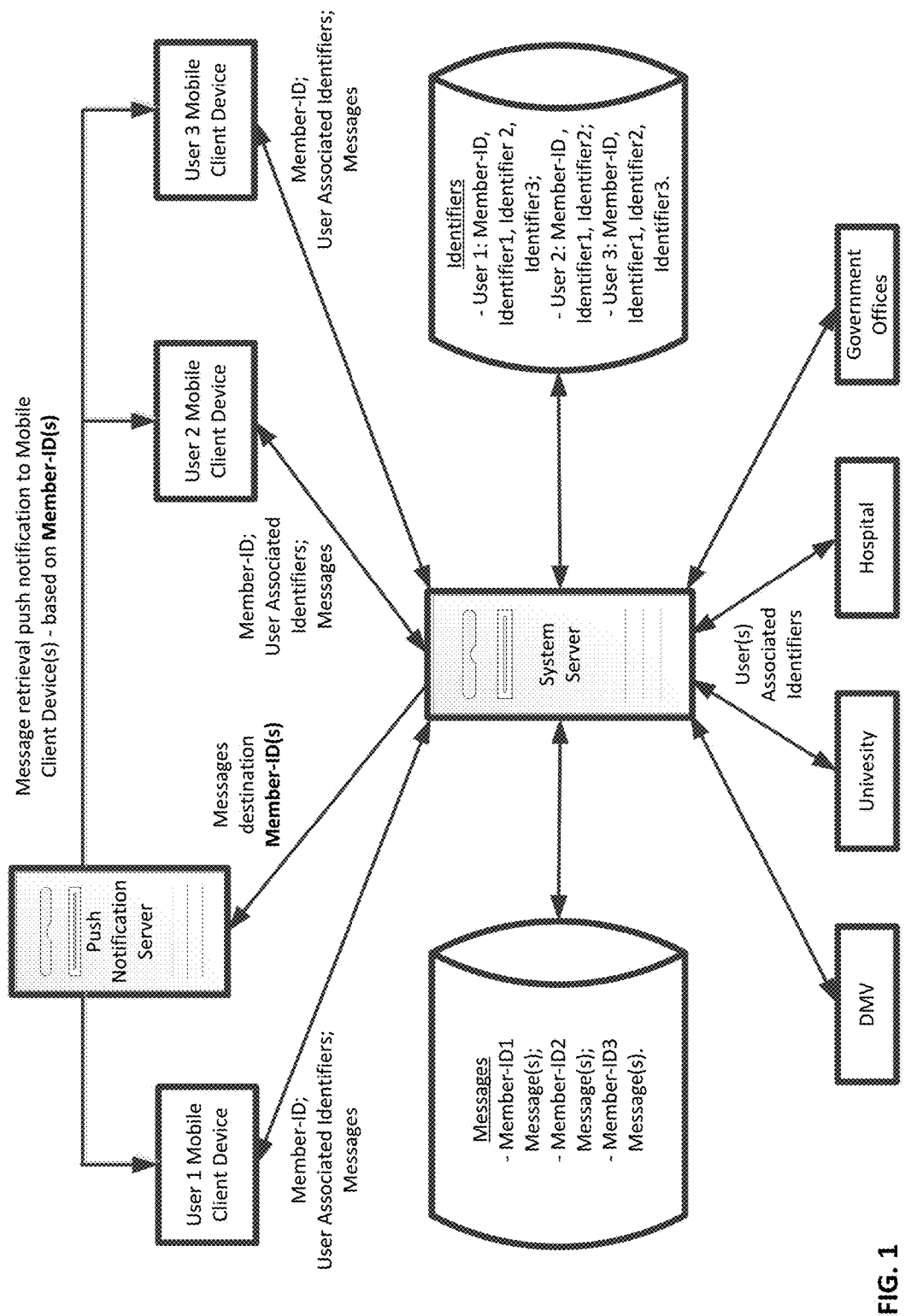
FIG. 1 shows a high level illustration of an exemplary messaging and multicasting system, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

\* \* \*

The present invention is a system method circuit and computer executable code for facilitating selective messaging and multicasting. A first user may utilize an identifier to contact one or more second users associated with the identifier. System users may associate themselves, and/or be associated by the system, with one or more identifiers, wherein each of the associated identifier(s) pertains to a set of one or more associating/associated user(s). The system may register for each of the users, along with the identifiers associated with her/him, a Member-ID. Upon receipt of an identifier and a message from a first user, the system may search for other user(s) associated with the identifier. Member-ID(s) of users found to be associated with the received identifier may be retrieved and utilized for saving the message, and/or a pointer/link thereto, to respective Member-ID(s) corresponding mailboxes. A push notification may be sent to each of the users having Member-ID(s) found to be associated with the received identifier, informing them of the received message and/or offering/allowing its retrieval.

In FIG. 1 there is shown, a high level illustration of an exemplary messaging and multicasting system, in accordance with some embodiments of the present invention.

According to some embodiments of the present invention, a system for facilitating selective messaging and multicasting may comprise: (1) two or more Computerized Client Devices, running an application, for inputting from each of their respective users, and relaying to a System Server: (i) a user Member-ID (e.g. username, login name, device token, GUID/combination-thereof), and (ii) one or more Identifiers to be associated with the user Member-ID of the relaying client device; and (2) the System Server for receiving and storing the Member-ID(s) and their associated Identifier(s) to (3) an Identifiers Database.

Figure 2A:
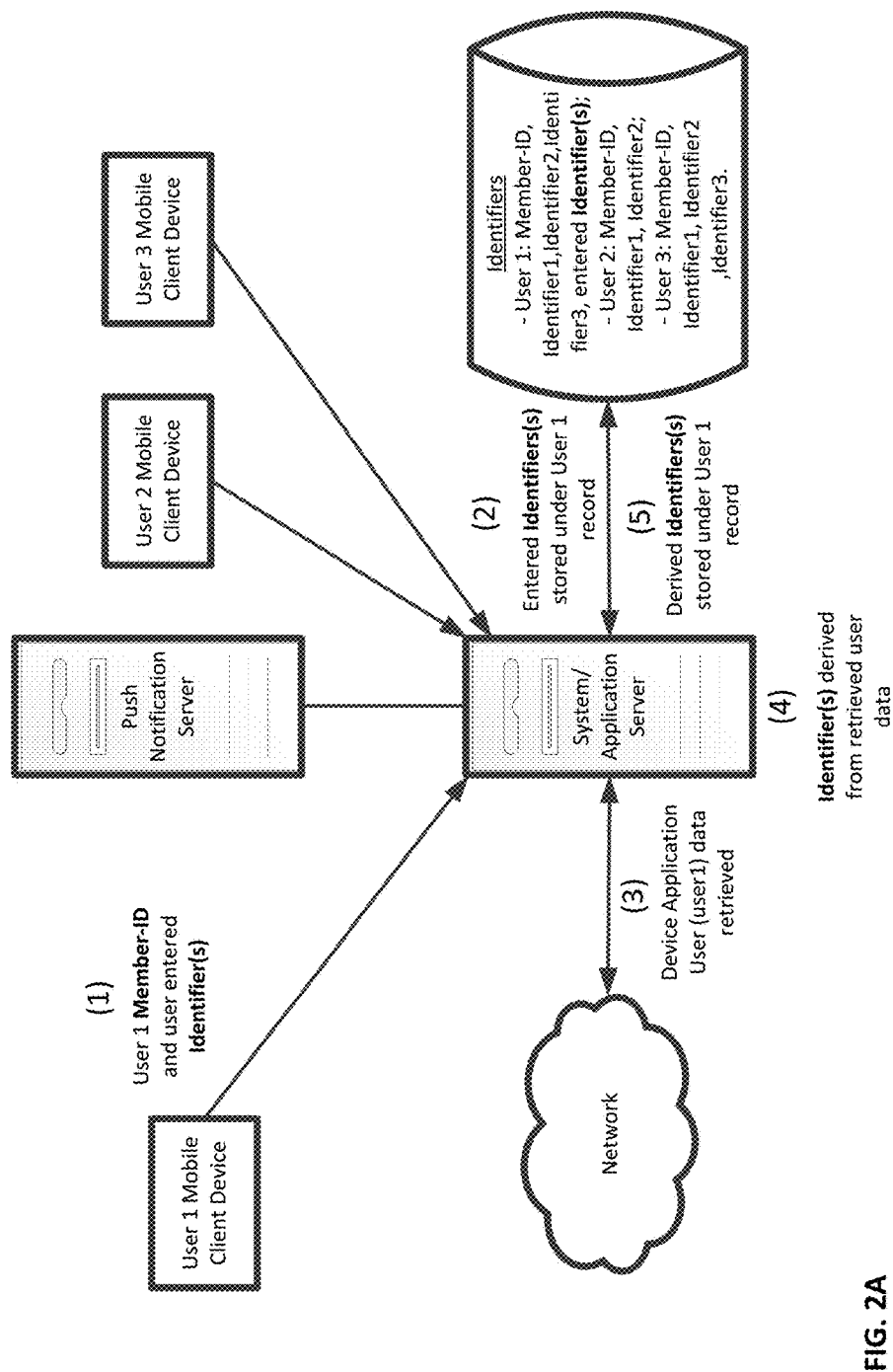
FIG. 2A shows a block diagram of an exemplary messaging and multicasting system performing an Identifiers Association process, in accordance with some embodiments of the present invention.
Figure 2B:
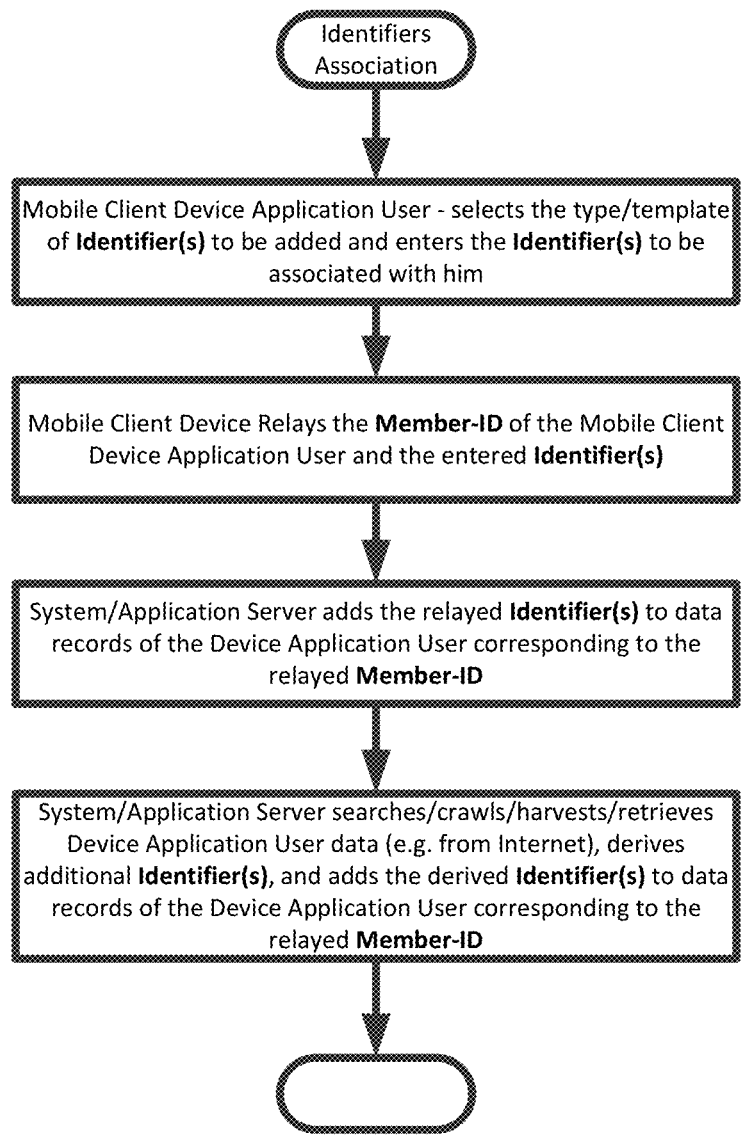
FIG. 2B is a flowchart of the main steps executed by an exemplary messaging and multicasting system, as part of an Identifiers Association process, in accordance with some embodiments of the present invention.

In FIG. 2A there is shown a block diagram of an exemplary messaging and multicasting system performing an Identifiers Association process, in accordance with some embodiments of the present invention; In FIG. 2B there is shown a flowchart of the main steps executed by an exemplary messaging and multicasting system, as part of an Identifiers Association process, in accordance with some embodiments of the present invention.

According to some embodiments of the present invention, upon receipt of a first user request including a Message and at least one user associated Identifier—the System Server may: (i) search the Identifiers Database and retrieve the Member-ID(s) of one or more second user(s) associated with the Identifier(s) included in the first user request, (ii) store the received message to (4) a Messages Database under specific Member-ID(s) corresponding locations (e.g. files, mailboxes, inboxes, folders or the like), of some or all of the Member-ID(s) associated with the Identifier(s) included in the first user request, and/or (iii) Notify Computerized Client Devices users having a Member-ID(s) associated with 'first user request Identifier(s)' (i.e. Member-ID(s) of the Message's intended recipient(s)/destination(s)) of the new Message stored to their Member-ID corresponding location.

According to some embodiments, notifying Computerized Client Device users of the new Message stored to their Member-ID corresponding location, may include: (i) the System Server forwarding the retrieved Member-ID(s) of the one or more second user(s) associated with the Identifier(s) included in the first user request, to an integral, a networked, and/or an elsewise functionally associated (5) Push Notification Server; (ii) the Push Notification Server for pushing 'new message' notifications to each of the Computerized Client Devices corresponding to the retrieved Member-ID(s); and/or (iii) each of the Computerized Client Devices that received a 'new message' notification, for accessing their respective Member-ID(s) corresponding location/inbox on the Messages Database and retrieving and presenting, or rendering an image of, the Message on each of the accessing Computerized Client Devices.

Accordingly, users may receive push notifications to their Computerized Client Devices, informing them that the Message has been stored to their Member-ID associated location, and then retrieve/view it using their Client Device Application. Alternatively, the Client Device Application may intermittently access the Messages Database (e.g. through the System Server), check its Member-ID associated location/inbox for new messages, and retrieve and/or present new messages if such have been received.

Figure 3A:
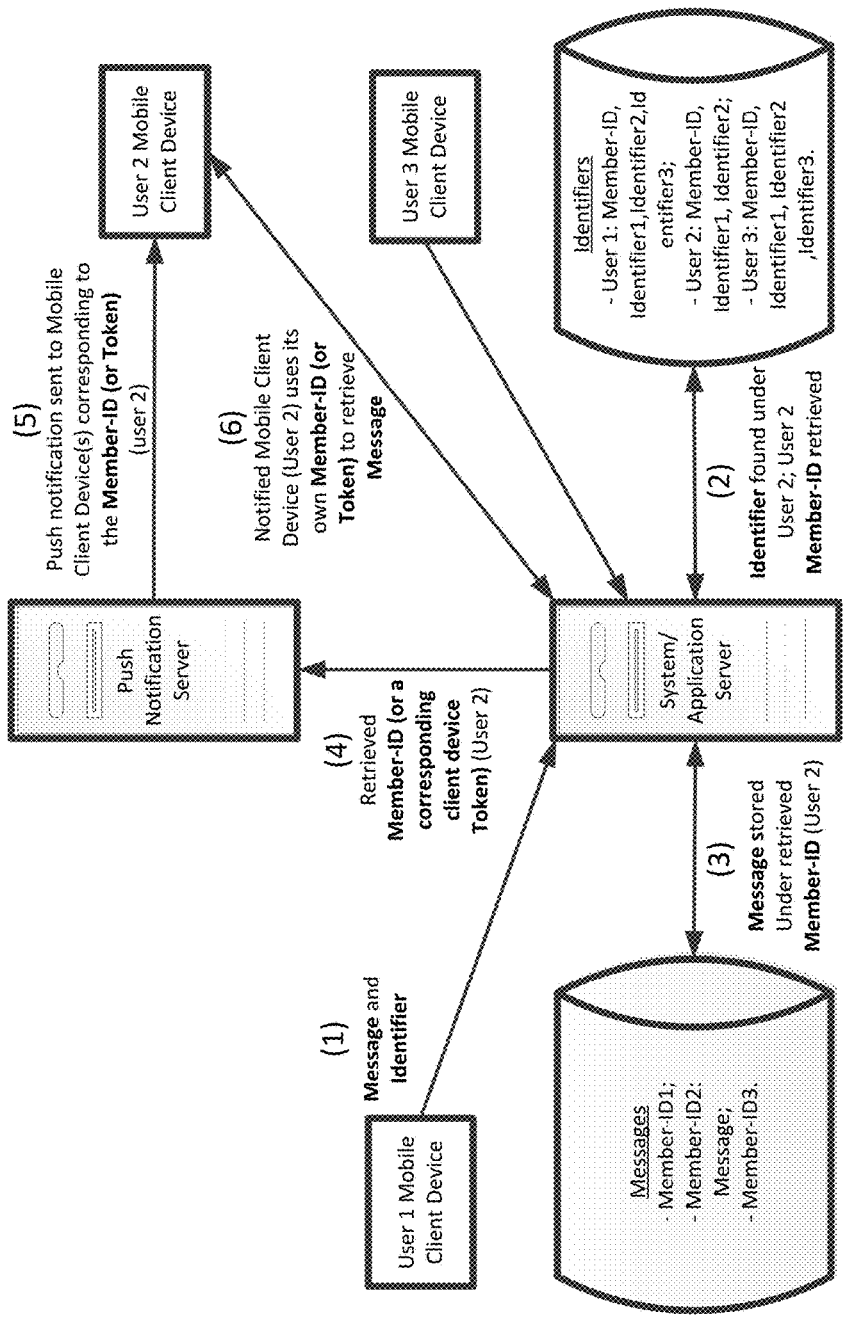
FIG. 3A shows a block diagram of an exemplary messaging and multicasting system performing a Selective Messaging process, in accordance with some embodiments of the present invention.
Figure 3B:
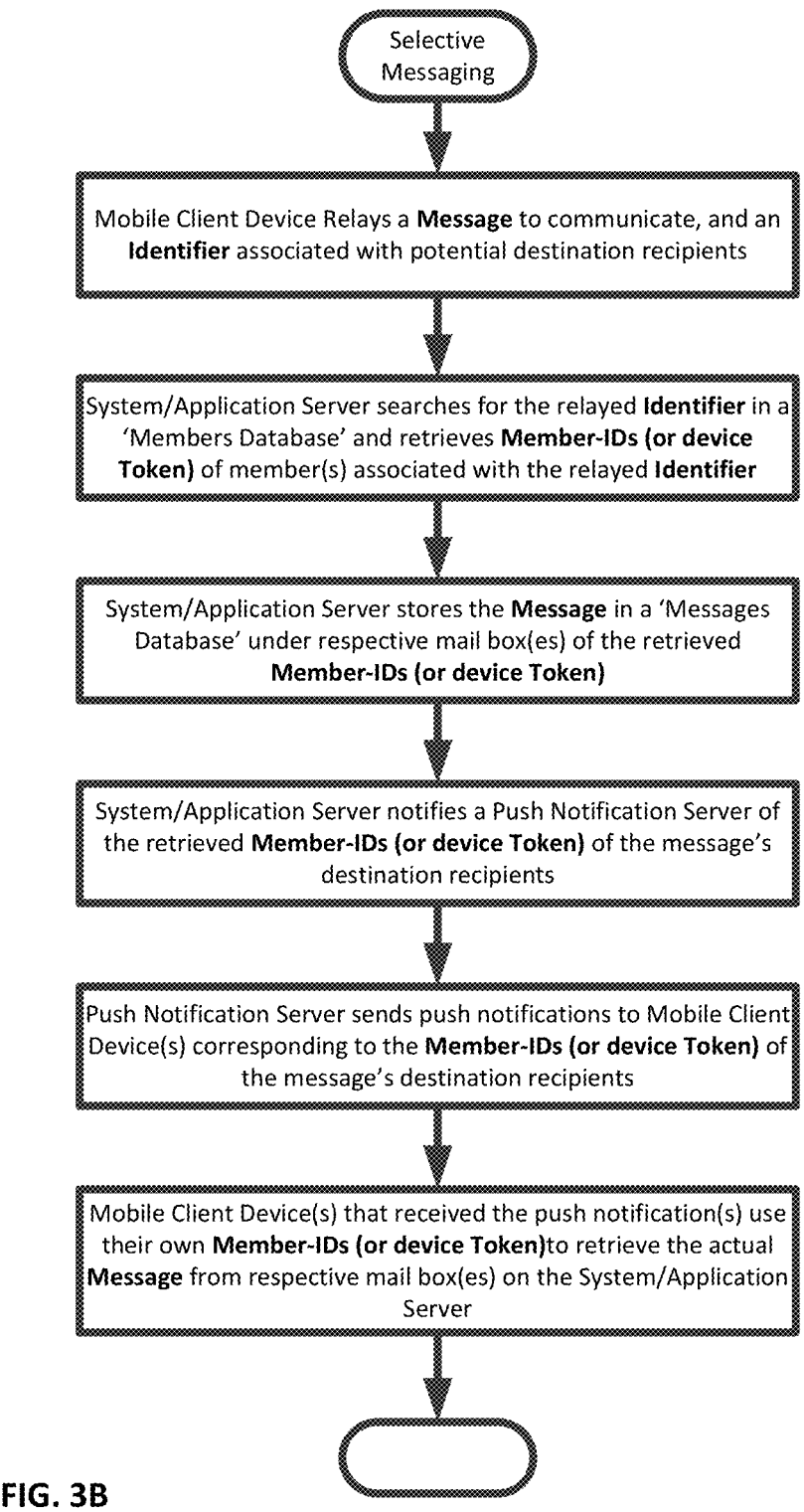
FIG. 3B is a flowchart of the main steps executed by an exemplary messaging and multicasting system, as part of a Selective Messaging process, in accordance with some embodiments of the present invention.

In FIG. 3A there is shown, a block diagram of an exemplary messaging and multicasting system performing a Selective Messaging process, in accordance with some embodiments of the present invention; In FIG. 3B there is shown, a flowchart of the main steps executed by an exemplary messaging and multicasting system, as part of a Selective Messaging process, in accordance with some embodiments of the present invention.

According to some embodiments, the System Server may retrieve one or more additional user associated identifiers, for previously registered system users that are already associated with a Member-ID, from public or private systems/databases (e.g. Ministry of Interior, Department of Motor Vehicles, University Graduates Listings, Police or Armed Forces Records, Financial Institutes). The retrieved identifiers may be added and stored to the records of the corresponding users, along with their stored Member-ID, and possibly their self-supplied identifiers, to the Identifiers Database.

According to some embodiments, the System Server may multicast a first user message to a group of one or more second users. A first user request may accordingly include at least one user associated Identifier and a multicasting message. The System Server may search the database for one or more second users associated with the Identifier included in the first user request and communicate, using the Member-ID of each of the found second users, the multicast message included in the first user request to each of the second users found. According to some embodiments, the first user request may include multiple user associated identifiers, and/or one or more multicasting conditions/rules. Accordingly, a first user multicast message may be communicated to: each second user associated with at least one of the multiple user associated identifiers, each second user associated with some (specific or nonspecific identifiers) of the multiple user associated identifiers, and/or each second user associated with all of the multiple user associated identifiers. According to some embodiments, the system may request/add positioning data (user entered/client device GPS) and/or a range/radius around the position, in which system users are to be included as the recipients of a broadcast/multicast message—providing they satisfy the filtering conditions/rules.

According to some embodiments, the first user request may include, in addition to, or instead of, the user associated identifier(s), one or more filters, conditions, and/or exceptions (hereinafter collectively referred to as: Filtering Condition(s)). The System Server, as part of searching the database for one or more second users associated with the identifier(s) included in the first user request, may remove users from, and/or add users to, the search results, based on the Filtering Conditions. Accordingly, a second user listed in the database and associated with an identifier(s) in a given first user request may, nevertheless, be removed from the search results list, as he does not comply with a Filtering Condition in the given first user request (e.g. his geographical position is beyond a threshold distance from the first user). Alternatively, a second user not listed in the database as associated with an identifier(s) in a given first user request may, nevertheless, be added to the search results list, as he complies with a Filtering Condition in the given first user request (e.g. his geographical position is below a threshold distance from the first user).

Figure 4A:
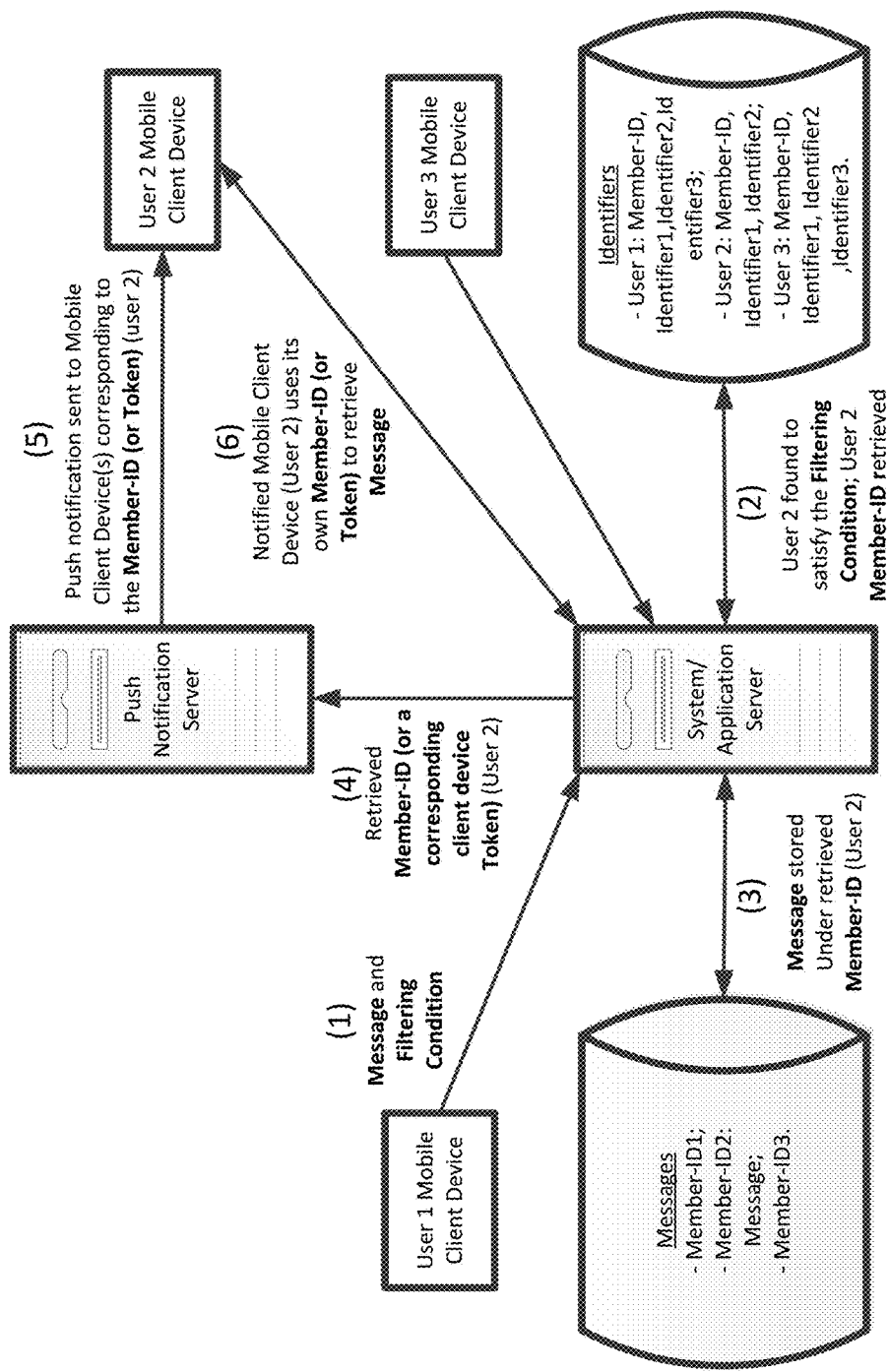
FIG. 4A shows a block diagram of an exemplary messaging and multicasting system performing a Selective Multicasting process, in accordance with some embodiments of the present invention.
Figure 4B:
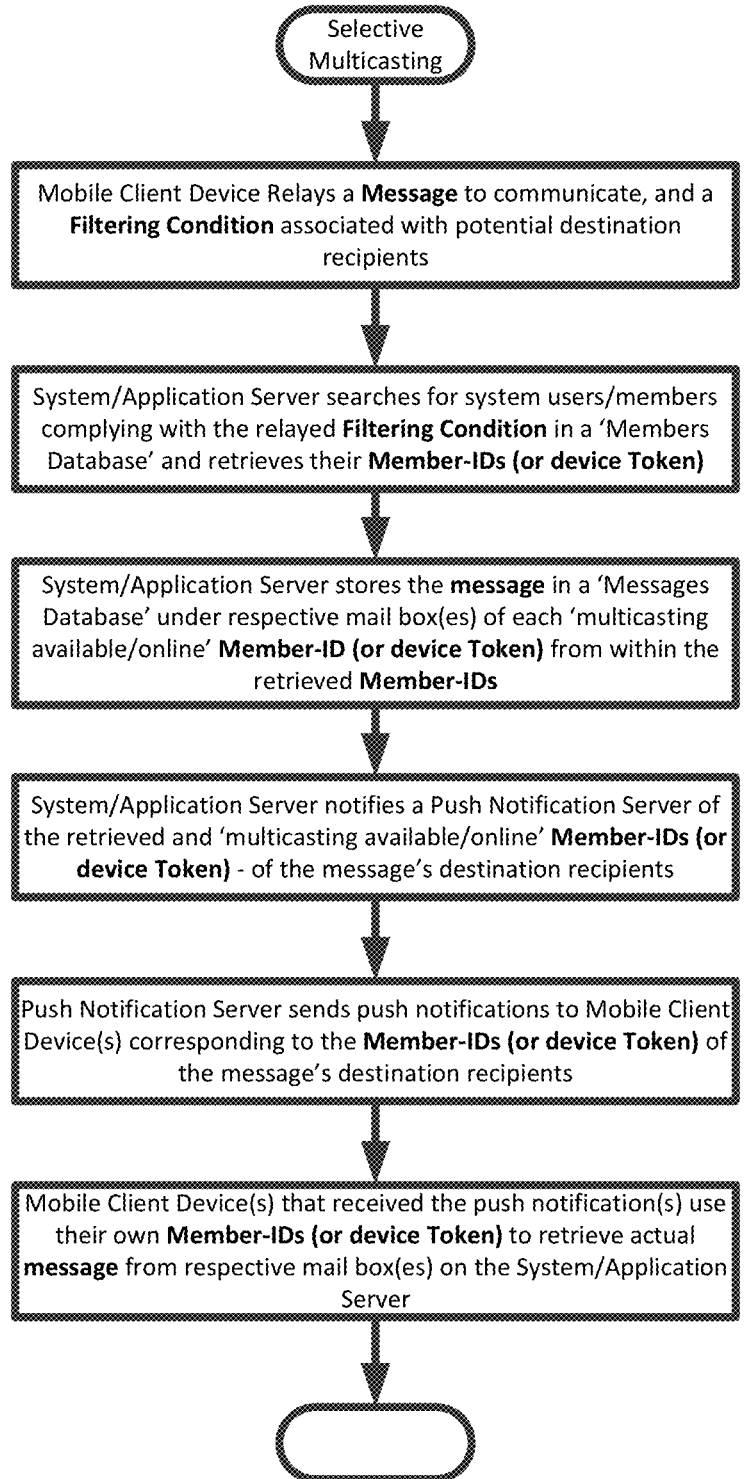
FIG. 4B is a flowchart of the main steps executed by an exemplary messaging and multicasting system, as part of a Selective Multicasting process, in accordance with some embodiments of the present invention.

In FIG. 4A there is shown, a block diagram of an exemplary messaging and multicasting system performing a Selective Multicasting process, in accordance with some embodiments of the present invention; In FIG. 4B there is shown, a flowchart of the main steps executed by an exemplary messaging and multicasting system, as part of a Selective Multicasting process, in accordance with some embodiments of the present invention.

According to some embodiments of the present invention, user sent/received messages, stored on the Messages Database, and/or user associated identifiers, stored on the Identifiers Database, may be inaccessible/secured, anonymous, and/or unsearchable. Accordingly, the Mobile Client Device Application and/or the System Server may not allow for, or prevent from, users to access and/or view some or all of the data records pertaining to other users, thus creating an anonymous network/environment wherein communications' sources and destinations may be based on user-associated, possibly structured/templated (i.e. put into templates), data (e.g. as Identifiers); and/or user-associated/user-activity-associated, possibly structured/templated, data (e.g. as Filtering Conditions)—rather than personal user identifying details such as the real name of the user and/or his phone number or e-mail address. According to some embodiments, nicknames or aliases may be associated with specific user-accounts and/or Member-IDs, possibly in a process that is substantially similar to the self-association of Identifiers with specific user Member-IDs, described and exemplified hereinbefore.

According to some embodiments of the present invention, Identifier(s), and Identifier(s) based communication/messaging schemes with other system users, may include, but are in no way limited to: (1) connecting with a driver who is driving in the proximity of the user, (2) connecting with a doctor or a lawyer whom their license number is the only information known to the user, (3) connecting with someone whose card number (e.g. student, diving, ID, passport, credit card, health care card, social security number) is the only information known to the user, (4) connecting with someone the user saw in a sport event (e.g. a marathon race) and only knows his/her race number, (5) connecting with someone the user saw in a flight and only knows his/her seat number, the flight number, and/or the date of the flight, (6) connecting with someone whose address (e.g. zip code+block number+ apartment number) is the only information known to the user, and/or (7) connecting with someone the user does not know personally but he/she exposed his/her system nick name (e.g. on the bag while he/she was sitting in a bar or a restaurant or on their luggage in a flight).

According to some embodiments of the present invention, Broadcasting/Multicasting Filtering Conditions, and Broadcasting/Multicasting Filtering Conditions based communication/messaging schemes with other system users, may include, but are in no way limited to: (1) broadcasting a regional message to drivers in the proximity of the user, or at a designated location wherein the user is not currently present, for finding out who is leaving a car parking in, or around, the area; at, or around, a specific time (e.g. now, this afternoon); (2) broadcasting a regional message to inform/alert drivers in the proximity of the user, or at a designated location wherein the user is not currently present, about a civic inspector or a police man who gives reports or tows cars; (3) broadcasting a categorical message, for example, to: lawyers, doctors, divers, Subaru drivers, specific street dwellers, Visa holders, and/or a specific flight passengers; that are (the lawyers/doctors/others/combinations—thereof . . . ) found in: such and such proximity, same town, same country, and/or the like—from the broadcasting/multicasting user.

According to some embodiments, certain Broadcasting/Multicasting Filtering Conditions relevant data, such as positioning data pertaining to the position of broadcasting/multicasting user (of his mobile device) may be added/declared/associated on the going/fly. For example, the user's vehicle location/positioning may be proactively and repetitively associated with the user's Member-ID, through the mobile device client application, each time the user initiates a regional broadcast/multicast message, and/or any broadcast/multicast message to which the user's/user's-vehicle position is relevant.

According to some embodiments, Broadcasting/Multicasting Filtering Conditions based communication/messaging/conversation capabilities may be utilized by users of the mobile client application to perform user broadcast/multicast communications/messaging/conversations to a selected population. The broadcast/multicast destinations user population selection may be based on country, location, category, and/or any other detail(s). For example: to all license car holders that are 1 kilometer around the user's (user device) current position, to all Subaru Forester 2004 holders, to all Visa holders, to all running race participants (e.g. Tel-Aviv 2014 Marathon), and/or the like; and/or to any combination of the above, or other, Filtering Conditions.

According to some embodiments of the present invention, the declaration/association of one or more Identifier(s) may be required in order to communicate messages through the system. According to some embodiments, user (Member-ID) associated Identifiers may be divided into categories by the Identifier declaring/associating user and/or by the system. Categories defined in the system/application may include, but are not limited to: Car (License) number, ID, Army ID, Professional Licenses number (Doctor, Lawyer), Cards number (e.g. Credit card, Student card, Diving card, Air crew card, Passport number, Social Security Number), Pets (Animal) chip Number, Telephone numbers (regular, cellular), Address (Zip-Building no.-Apartment No.), Events—Number of participant in a sport race (Running, Bicycling), Seat number on a flight (Date, flight no.).

According to some embodiments, some or all of the Identifier categories may allow for the user to utilize the client device application for adding supplemental details. For example, for a 'car license plate number' category, in addition to his car license number, the user may add the car Manufacturer, Model, Year, Color, and/or the like. According to some embodiments, for at least some of the Identifiers, the user may utilize the client device application for adding a location—that may or may not be his own current position. The location may not be automatically added in order to comply with the application's 'privacy policy' or 'privacy settings'.

According to some embodiments, the user may utilize the client device application for defining new events such as, but not limited to, sporting or racing events, competition/tournament type events, and/or any multi-participant events wherein participants are identifiable by their association to a participant code/number/label. According to some embodiments, given user defined event(s), may appear and/or be presented/available for use by other application users. According to some embodiments, the system may receive/collect/harvest event related data from various Internet/social-network locations, and automatically define events that may then be used by the users as part of their Identifiers/Filtering-Conditions declaration/association.

According to some embodiments of the present invention, some or all of the user associated Identifiers may be coupled to position stamps/indictors provided/elected by the user and/or received from the GPS module of the user's client device at or around the time when a given Identifier is associated with the user. According to some embodiments, based on the type and/or category of a given user associated Identifier and the position/location of the user at the time of the Identifier's association, the type of place/location/venue at which the user is present may be deducted. According to some exemplary embodiments, a position at which one or more attorney registration numbers are associated—may be registered as a law office; a position, or multiple linked positions (e.g. along a line) at which vehicle license plate numbers are associated—may be registered as a highway; and/or a position at which one or more doctor registration numbers are associated—may be registered as a hospital.

According to some embodiments, sets of multiple user(s)' positions/locations estimated/determined to belong to the same type of place/location/venue may be grouped to form a map of such similar type places/locations/venues. According to some embodiments, multiple maps, for multiple places/locations/venues types, may be combined to form a multi-layer map, wherein each layer pertains to a different places/locations/venues type.

According to some embodiments, mapped or non-mapped Identifiers associated positions may be utilized for finding/locating stolen or lost items/property. Accordingly, a position-coupled Identifier uploaded by, and/or being associated to, a user may be checked against system Identifiers related data, and/or against external databases, to determine the 'status' of the entity to which the Identifier pertains. For example, a license car plate number Identifier may be used for referencing a Department of Motor Vehicles (DMV) or Police database of stolen and/or non-licensed vehicles; a dog chip/collar number Identifier may be checked against other dog collar number Identifiers in the system for finding dog collar number Identifiers pertaining to dogs reported as lost; and/or a cattle specimen number Identifier may be checked against other cattle specimen number Identifiers in the system for finding cattle specimen number Identifiers pertaining to specimens reported as lost or stolen.

According to some embodiments, users may be offered/requested to provide their nickname/alias on their system signup or first login. Users may then utilize the client device application for defining and/or managing user groups based on the provided user nicknames/aliases, and/or based on any other data field in the user records that is at least partially shared with other system users. According to some embodiments, messages and broadcasts/multicasts may be made to one or more 'specific Identifier associated' user(s), to a group of users, and/or to any combination thereof. According to some embodiments, users may utilize the client device application for defining and/or managing groups that are based on different types/categories of Identifiers. For example, a group consisting of users associated with a certain car license plate number that was seen on a car, in combination with users having certain professional license/number that were taken from a signed document.

According to some embodiments, system facilitated communications, messaging, and/or conversations may include: textual data, imaging data, acoustic data, positioning data, metadata, and/or any other type or format of digital or digitized data known today or to be devised in the future. According to some embodiments, system messages may include a body (e.g. text) and an attachment (e.g. video, acoustic).

According to some embodiments, as part of the system's privacy policy or settings, user details (e.g. excluding the user's nickname) may remain unexposed to other users. Accordingly: user-details searching may be intentionally limited or altogether prevented/unavailable/non-existent; user location/position may not be automatically followed; processing and/or storage of user communications, messaging, and/or conversations data may be limited or altogether prevented/unavailable/non-existent; and/or integration with other applications (e.g. Facebook, Skype) may be limited or altogether prevented/unavailable/non-existent.

According to some embodiments of the present invention, further examples of selective messaging and/or broadcasting/multicasting communications, and/or examples of user associated Identifiers and/or Filtering Conditions based messaging and/or broadcasting/multicasting communications, may include, but are not limited to: communicating with lodgers in an apartment by sending a message to their identifier (Zip Code+Building Number+Apartment Number); communicating with lodgers in a street, neighborhood or city by sending them a broadcast message; communicating with an air crew team by sending a message to their identifier (Air crew card Number); communicating with soldiers by sending a message to their identifier (Army ID); communicating with cattle owners by sending a message to the cattle identifier (Chip or Ear Sign); communicating with Credit Card Owner by sending a message to the Credit Card identifier (Credit Card Number); communicating with Credit Card Holders by sending them a broadcast message, wherein holders of a specific issue company are selected, for example: Visa or MasterCard; communicating with Divers by sending a message to the diver identifier (Diving License Number); communicating with Divers by sending them a broadcast message, wherein divers are selected by their diving level, for example: 2 stars; communicating with Doctors by sending a message to the Doctor identifier (Doctor License Number); communicating with Doctors by sending them a broadcast message, wherein doctors are selected by their professional skill, for example: Orthopedics, or by the year of issuing of their license; defining of events wherein members may be clearly identified, for example: running race members who are signed by a number, or someone who flew in flight by his seat on that specific flight, and communicating with the event's participants by sending a message to their identifier in the specific event (runner Number or Date+Flight+Seat no.), and/or communicating with members by sending them a broadcast message, for example: all members of a specific marathon race or a specific flight; communicating with people by sending a message to one of their specific identifier (ID Number); communicating with Lawyers by sending a message to the Lawyer identifier (Lawyer License Number); communicating with People by sending a message to their identifier (Nick Name) when their nick name has been exposed (e.g. on: a suitcase, a handbag, a hat, a bracelet, an armlet, a bangle, or on a clip; communicating with People by sending a message to their Passport (Passport Number); communicating with People by sending them a broadcast message based on their Passport Type, for example: Regular, Diplomatic; communicating with People by sending a message to their Pet Identifier (Chip number); communicating with People by sending a message to their Social Security Number (SSN) (Social Security Number); communicating with Students by sending a message to their Student Card Number; communicating with Students by sending them a broadcast message based on their academic institute while sorting out (or not) current students; communicating with People by sending a message to their Telephone (Static or mobile) Number; and/or communicating with People by sending them a broadcast message based on their Country or Country Code Telephone Prefix.

According to some embodiments of the present invention, further examples of selective messaging and/or broadcasting/multicasting communications, and/or examples of user associated Identifiers and/or Filtering Conditions based messaging and/or broadcasting/multicasting communications, may include, but are not limited to: communicating with People by sending a message to their Car License Plate Number; and/or communicating with People by sending them a broadcast message based on a Car Manufacturer, Car Model, Car Color, Year, Energy Source, Is 4×4—wherein communicating may, for example, relate to: their car functioning, their driving behavior, familiarity, their leaving of a parking spot, the garage or spare parts they use, the possible selling of their/your car, and/or for telling them about a civic inspector or a police man who gives reports or tows cars.

According to some embodiments of the present invention, further examples of selective messaging and/or broadcasting/multicasting communications, and/or examples of user associated Identifiers and/or Filtering Conditions based messaging and/or broadcasting/multicasting communications, may include, but are not limited to: communicating with People by sending a message to their Driving License Plate Number; communicating with People by sending them a broadcast message based on their Driving License Properties, for example: Private, Public, Trucks, Semi-Trailer, Motorcycle, Tractor; communicating with People by sending a message to their E-Mail account; and/or communicating with People by sending a message to their IP Address.

According to some embodiments of the present invention, a system for selective messaging, may comprise: two or more application running mobile client devices each adapted for: associating system users with one or more identifiers, and relaying a first user message and one or more first user selected identifiers to a system server; and the system server for relaying the message to one or more second users each associated with some or all of the first user selected identifiers.

According to some embodiments of the present invention: at least some of the identifiers may be based on identifiers of participants of an event; at least some of the identifiers may be retrieved by the application running mobile client devices from the Internet; at least some of the identifiers may be retrieved by the system server from the Internet; at least some of the identifiers may be associated with a geo-position; at least some of the geo-position associated identifiers may be associated based on the geo-position of the application running mobile client device at or around the time when the identifier was associated with a system user; and/or at least some of the geo-position associated identifiers may be associated based on the category of the geo-position associated identifier, as selected by the application running mobile client device user at or around the time when the identifier was associated with that system user.

According to some embodiments of the present invention, the system server may be further adapted to cluster multiple sets of geo-positions of identifiers pertaining to similar categories into a multi-layer map wherein each layer pertains to geo-positions of a similar category.

According to some embodiments of the present invention, a system for selective messaging, may comprise: two or more application running mobile client devices each adapted for: associating system users with one or more identifiers and identifier characteristics, and relaying a first user message and one or more user selected filtering conditions to a system server; and the system server for relaying the message to one or more second users each having identifier characteristics satisfying some or all of the first user selected filtering conditions.

According to some embodiments of the present invention: at least some of the identifiers or identifiers characteristics may be based on identifiers of participants of an event; at least some of the identifiers or identifiers characteristics may be retrieved by the application running mobile client devices from the Internet; at least some of the identifiers or identifiers characteristics may be retrieved by the system server from the Internet; at least some of the identifiers or identifiers characteristics may be associated with a geo-position; at least some of the geo-position associated identifiers or identifiers characteristics may be associated based on the geo-position of the application running mobile client device at or around the time when the identifier was associated with a system user; and/or at least some of the geo-position associated identifiers or identifiers characteristics may be associated based on the category of the geo-position associated identifier or identifier characteristics, as selected by the application running mobile client device user at or around the time when the identifier was associated with that system user.

According to some embodiments of the present invention, the system server may be further adapted to cluster multiple sets of geo-positions of identifiers or identifiers characteristics pertaining to similar categories into a multi-layer map wherein each layer pertains to geo-positions of a similar category.

According to some embodiments of the present invention, a method for selective messaging, may comprise: associating system users with one or more identifiers; relaying a first user message and one or more first user selected identifiers to a system server; and relaying the message to one or more second users each associated with some or all of the first user selected identifiers.

According to some embodiments of the present invention, at least some of the identifiers may be based on identifiers of participants of an event; at least some of the identifiers may be retrieved by the system user from the Internet; and/or at least some of the identifiers may be associated with a geo-position based on their identifier selected identifier category or based on the geo-position of the identifier-associating system user, at or around the time when the identifier was associated with that system user.

* * *

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for selective messaging, said system comprising:
   a data storage containing a list of member identifiers (MIDs), each MID identifying a specific human member, and, for each listed MID:
   a. a set of secondary identifiers correlated to the listed MID, and
   b. one or more mobile devices associated with the listed MID
   wherein the secondary identifiers are character strings, associated with the specific member, other than the MID and identifiers associated with the one or more mobile devices;

a messages database configured to store messages in correlation to MIDs;

two or more client applications, each running on a given mobile client device and configured to:
- (i) cause the given mobile client device to communicate to the data storage an event specific secondary identifier to be associated with a given human member associated with the given mobile client device, the event specific secondary identifier being a unique identifier of the given human member assigned to the given human member by an organizer of a specific event involving multiple human members, the multiple human members involved in the event each being assigned an event specific secondary identifier by the organizer for the purpose of the event;
- (ii) cause the given mobile client device to transmit to an associated system server a first message and a selected event specific secondary identifier associated with the first message, and
- (iii) retrieve from said messages database messages correlated to the given MID; and said system server being communicatively coupled to said data storage and said messages database and configured to:
- (i) receive the first message and the selected event specific secondary identifier associated with the first message;
- (ii) identify a target MID associated with the received selected event specific secondary identifier in the data storage; and
- (iii) transmit the first message to a mobile device associated with the target MID in the data storage.

2. The system according to claim 1 wherein the event specific secondary identifiers are numeric identifiers assigned to participants of the event.

3. The system according to claim 1 wherein the event specific secondary identifier is retrieved by said application from the Internet.

4. The system according to claim 1 wherein the event specific secondary identifier is retrieved by said system server from the Internet.

5. The system according to claim 1 wherein said system server is further adapted to cluster geo-positions of mobile devices associated with selected event specific secondary identifiers.

6. The system according to claim 1, wherein either said system server or said client applications is further configured to retrieve, from the Internet, secondary identifiers relating to members listed in said database and add the retrieved secondary identifiers to said sets of secondary identifiers.

7. A method for selective messaging, said method comprising:

maintaining a data storage containing:
a list of member identifiers (MIDs), each MID identifying a specific human member, and for each listed MID:
- a. a set of secondary identifiers correlated to the listed MID, and
- b. one or more mobile devices associated with the listed MID wherein the secondary identifiers are character strings, associated with the specific member, other than the MID and identifiers associated with the one or more mobile devices;

maintaining a messages database configured to store messages in correlation to MIDs;

receiving from each of a set of client applications, each running on a given mobile client device, an event specific secondary identifier to be associated with a given human member associated with the given mobile client device, the event specific secondary identifier being a unique identifier of the given human member assigned to the given human member by an organizer of a specific event involving multiple human members, the multiple human members involved in the event each being assigned an event specific secondary identifier by the organizer for the purpose of the event;

receiving at a system server, from one of the client applications, a first message and one or more first user selected event specific secondary identifiers;

using the system server to identify all MIDs associated with the received selected event specific secondary identifier in the data storage;

storing the first message in the messages database in correlation with each identified MID; and relaying the first message to client applications associated with the identified MIDs, by request from the client applications.

8. The method according to claim 7, wherein the event specific secondary identifier is retrieved by the system from the Internet.

9. The system according to claim 7, wherein at least two MIDs are associated with the selected event specific secondary identifier.

* * * * *